US012360825B2

(12) United States Patent
Kalinin et al.

(10) Patent No.: US 12,360,825 B2
(45) Date of Patent: Jul. 15, 2025

(54) DEADLOCK PREVENTION UTILIZING DISTRIBUTED RESOURCE RESERVATIONS

(71) Applicant: MICRO FOCUS LLC, Santa Clara, CA (US)

(72) Inventors: Alexander Kalinin, Watertown, MA (US); Thao Nguyen Pham, Cambridge, MA (US); Yuanzhe Bei, Marblehead, MA (US)

(73) Assignee: Micro Focus LLC, Santa Clara, CA (US)

( * ) Notice: Subject to any disclaimer, the term of this patent is extended or adjusted under 35 U.S.C. 154(b) by 84 days.

(21) Appl. No.: 18/385,973

(22) Filed: Nov. 1, 2023

(65) Prior Publication Data

US 2025/0138906 A1   May 1, 2025

(51) Int. Cl.
*G06F 9/52* (2006.01)
*G06F 9/54* (2006.01)
*H04L 67/1012* (2022.01)

(52) U.S. Cl.
CPC .............. *G06F 9/526* (2013.01); *G06F 9/546* (2013.01); *H04L 67/1012* (2013.01)

(58) Field of Classification Search
CPC ...... G06F 9/526; G06F 9/546; G06F 11/3006; G06F 3/0631; G06F 9/50; H04L 67/1012
See application file for complete search history.

(56) References Cited

U.S. PATENT DOCUMENTS 7,958,242 B2 * 6/2011 Rey ...................... H04L 65/765
                                                              709/227
10,162,678 B1 * 12/2018 Stafford .............. H04L 67/1008

OTHER PUBLICATIONS

"The Spread Toolkit," Spread Concepts LLC., 2016, 2 pages [retrieved online Feb. 26, 2024 from: www.spread.org/SpreadOverview.html].

* cited by examiner

*Primary Examiner* — Idriss N Alrobaye
*Assistant Examiner* — Richard B Franklin
(74) *Attorney, Agent, or Firm* — Sheridan Ross P.C.

(57) ABSTRACT

In multi-threaded or multi-processor computing systems, a deadlock may occur when two or more processes or threads are unable to proceed because they are each waiting for a resource that the other holds. As a result, progress is halted because conflicting entities are stuck in a circular dependency, and none can release the resources they hold to let the others continue. Systems and methods are provided wherein a resource reservation is carried out in two steps. The first step causes query nodes to add an identifier to a queue and, upon a request and the identifier being in a first position, a non-sharable resource is reserved. As a result, non-sharable resources are reserved in order and when needed, thereby preventing deadlocks.

20 Claims, 6 Drawing Sheets

DEADLOCK PREVENTION UTILIZING DISTRIBUTED RESOURCE RESERVATIONS

FIELD OF THE DISCLOSURE

The invention relates generally to systems and methods for preventing deadlocks and particularly to preventing deadlocks using a resource reservation.

BACKGROUND

In multi-threaded or multi-processor computing systems, a deadlock may occur when two or more processes or threads are unable to proceed because they are each waiting for a resource that the other holds. As a result, progress is halted because conflicting entities are stuck in a circular dependency, and none can release the resources they hold to let the others continue.

There are various forms of deadlock, including a resource deadlock. A resource deadlock occurs when processes or threads compete for a finite number of resources, such as memory, files, or devices. Each process holds a resource and is waiting for another resource held by another process, creating a cycle of dependency. For example, Process A has Resource X and is waiting for Resource Y, while Process B has Resource Y and is waiting for Resource X. A communication deadlock occurs when the processes are waiting for a message or response from each other indefinitely, effectively blocking the entire system's progress. A thread deadlock occurs when multiple threads compete for shared resources like locks or mutexes. If each thread holds one resource and is waiting for another, a thread deadlock situation can arise. A database deadlock occurs when two or more transactions are waiting for each other to release the locks they hold on a database record, preventing any of them from completing their task. A file system deadlock occurs when multiple processes or threads need access to files or directories on a file system. A file system deadlock can occur if the processes or threads lock resources in a way that creates a circular waiting condition.

Prior art solutions to preventing and managing deadlocks include visualization of resource allocations with resource allocation graphs; timeouts to cause processes to release resources held for a pending task, fixed priorities or rules to force a process to wait to allocate a resource or to release a resource requested by another process, deadlock detection and process termination/restart, and avoidance algorithms (e.g., the Banker's algorithm) to ensure allocation will not lead to a deadlock. Despite these efforts to prevent, detect, and resolve deadlocks, deadlocks can and do still occur.

SUMMARY

These and other needs are addressed by the various embodiments and configurations of the present invention. The present invention can provide a number of advantages depending on the particular configuration. These and other advantages will be apparent from the disclosure of the invention(s) contained herein.

In one embodiment, a resource reservation is carried out in two steps, wherein the first step differs depending on whether the query is targeted to a sub-cluster of nodes or a global (e.g., two or more sub-clusters) of nodes.

As used herein, a query node shall refer to a computational node in a computing system that participates in the execution of a query (or a portion thereof). For a sub-cluster query, all query nodes belong to a single sub-cluster. For a global query, the query nodes are distributed in multiple sub-clusters in a cluster. A query is initiated at a single node called a query initiator, or simply, an initiator. The query initiator may also be a query node.

A system on a chip (SoC) including any one or more of the above aspects or aspects of the embodiments described herein.

One or more means for performing any one or more of the above or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects or aspects of the embodiments described herein, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
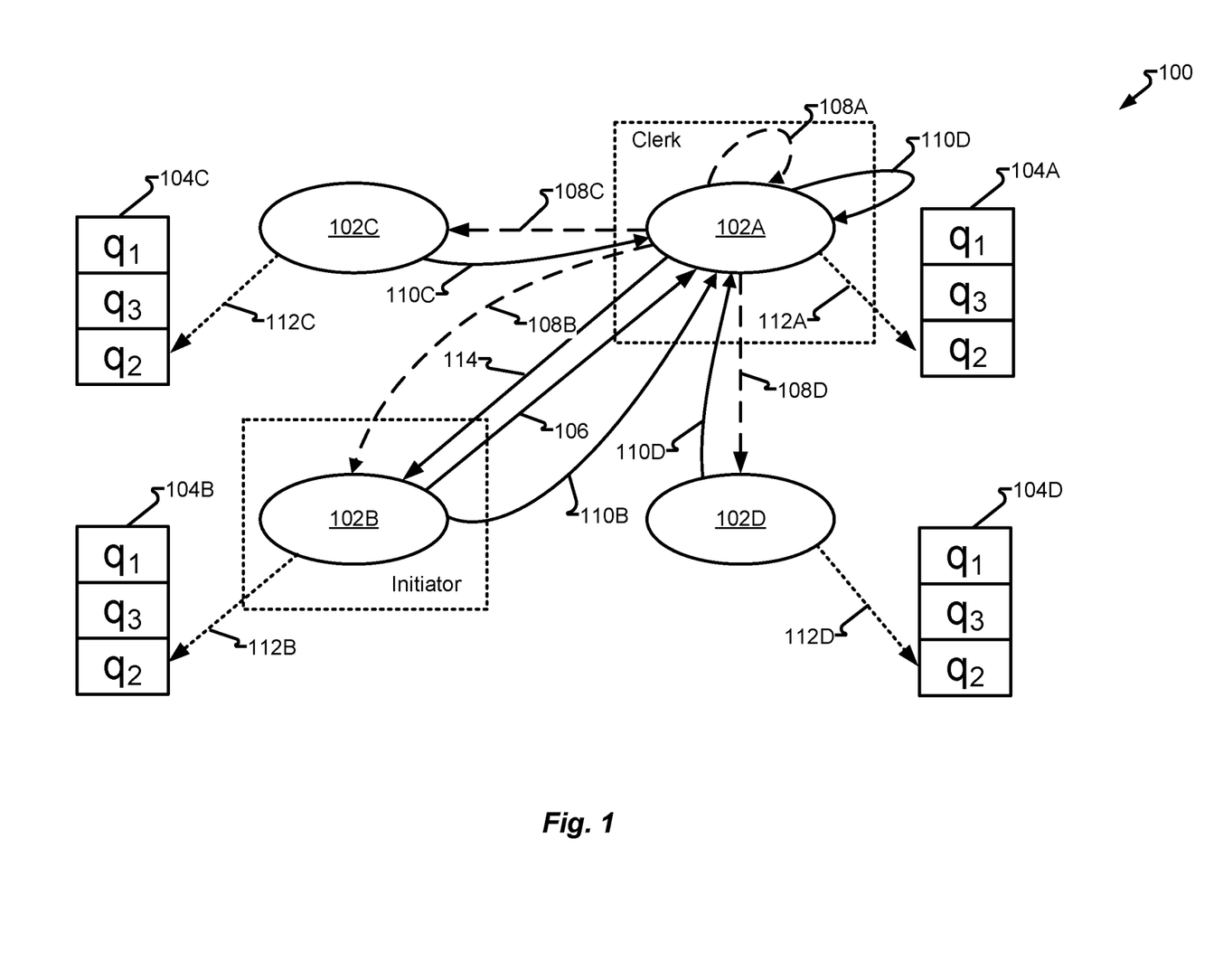
FIG. 1 depicts a sub-cluster in accordance with embodiments of the present disclosure.

FIG. 1 depicts sub-cluster 100 in accordance with embodiments of the present disclosure. Sub-cluster 100 comprises a plurality of processing components (i.e., query nodes), such as node 102A, 102B, 102C, and 102D. It should be appreciated that more or fewer query nodes 102 may be implemented without departing from the scope of the embodiments herein. Each node 102 comprises hardware, such as a processor and network interface to a network (not shown). Query nodes 102 are tasked to perform a query; however, in other embodiments, query nodes 102 may perform other tasks that require the use of non-sharable resources (e.g., memory, CPU, temporary disk space, treads, etc.). A non-sharable resource may be a database record, communication hardware (e.g., port, address, etc.), or other finite resource that cannot be used concurrently by two or more query nodes 102 either at all or for the purpose of completing the query or other task of query nodes 102. For example, a non-sharable resource for query nodes 102 may require the locking of a database record by one of query nodes 102 in order to perform an operation. The non-shareable resource may be a single non-sharable resource or a plurality thereof. As a result, no other query node 102 may similarly lock and use the database record. Additionally or alternatively, the non-shareable resource, such as the database record in the preceding example, may remain usable for different purposes (e.g., tasks that utilize a sharable aspect of the otherwise non-sharable resource), such as read-only access requests performed by a different process or a previously allocated communication port that may be unavailable for communicating but remain available to respond to status inquiry tasks.

In one embodiment, query node 102B receives a query request for execution in a distributed system, such as by query nodes 102A-C of sub-cluster 100. An initiator (e.g., query node 102B) generates and sends spot reserve request 106, which is associated with the query request, to a clerk node, such as query node 102A. In response, query node 102A (as clerk node) sequentially forwards the "spot reserve" request as spot reserve requests 108A-108C. As illustrated, query node 102A is both the clerk node and a query node. Clerk node (e.g., query node 102A) may be a clerk node and a query node (e.g., one of query nodes 102). Alternatively, query node 102A may be a query node and not serve as a clerk node wherein a different one of query nodes 102 is designated as clerk node. As another alternative, query node 102A may serve as clerk node without performing any query and be excluded as a member of query nodes 102 for the purposes of reserving a resource or performing the query. As a further option, the clerk node designation may be omitted, such as when the initiator (e.g., query node 102B) incorporates the functionality of the clerk node.

In response to receiving spot reserve requests 108 by query nodes 102, each query node 102 performs addition 112 to add an identifier of the underlying query (e.g., "q2"), to the end position of their respective queue 104 and provides response 110 back to the clerk node (e.g., query node 102A). Upon receiving all responses 110 to all spot reserve requests 108, the clerk node (e.g., query node 102A) may then proceed to process the next "spot reserve" request associated with a second query.

The clerk node (e.g., query node 102A) may be elected to serve the clerk node role such as by using any known leader election protocols. The election of the clerk node may be performed during cluster formation (e.g., a cluster that includes sub-cluster 100) or when a previously designated clerk node leaves the cluster or becomes inoperable.

In another embodiment, in response to the clerk node (e.g., query node 102A) having received all responses 110, clerk node (e.g., query node 102A) sends response 114 to the initiator (e.g., query node 102B) indicating that the "spot reserve" operation has been completed. The initiator node (e.g., query node 102B) then instructs each query node 102 to reserve the resources that will be required for the query.

Query nodes 102 will process the queries in queues 104 in a first-in-first-out (FIFO) order. Once a query has been performed, the query's identifier is removed from queues 104. In response to reservation requests each query node 102 processes other queries until the query's identifier (e.g., "q2") is in the first entry in queues 104 and, when true, reserves the required non-sharable resource. As a benefit, the entries in queues 104 are performed in FIFO order and resources are reserved for all queries in the same order in all query nodes 102, thereby preventing deadlock over a non-sharable resource(s).

Figure 2:
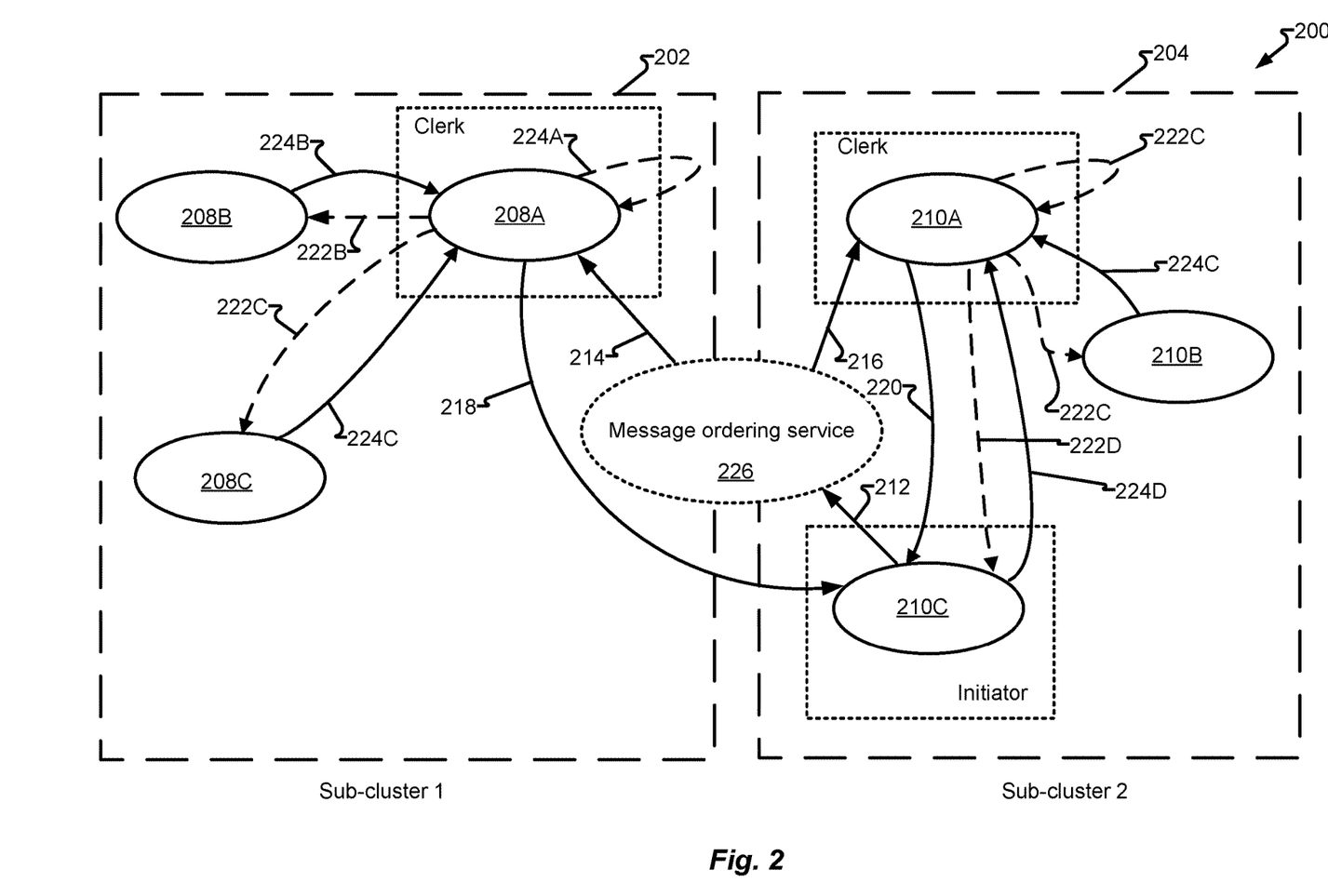
FIG. 2 depicts a cluster of sub-clusters in accordance with embodiments of the present disclosure.

FIG. 2 depicts cluster 200 of sub-clusters in accordance with embodiments of the present disclosure. A cluster, such as cluster 200 comprise multiple sub-clusters, such as sub-cluster 202 and sub-cluster 204. A query may be executed by nodes 208 and nodes 210 of sub-cluster 202 and sub-cluster 204, respectively. Similar to the "spot reserve" requests of a single sub-clusters (see FIG. 1), the "spot reserve" request needs be in the same order at all query nodes in all sub-clusters. Generally, the proportion of queries that are global queries (e.g., queries that utilize nodes in multiple sub-clusters) is much smaller than queries that require only a single sub-query. Global queries are generally used to monitor system statuses and obtain statistics. As a benefit, having a separate clerks for each subcluster allows multiple resource reservation requests to happen concurrently without requiring a global coordination between clerks.

In one embodiment, spot reserve request 212 originates from an initiator (e.g., query node 210C) and is sent to message ordering service 226. Message ordering service 226 ensures that the order of requests sent to message ordering service 226 land sub-cluster clerk (e.g., sub-cluster clerk services that are or are provided by query nodes 208A and 210A) in order and, in turn, land on query nodes 208 and query nodes 210 in the same order. Message ordering service 226 may be a daemon such as Spread, available from Spread Concepts, LLC (see, www.spread.org/SpreadOverview.html). As a result, spot reserve request 212 is forwarded to sub-cluster clerk nodes (e.g., query node 208A and query node 210A) as messages 214 and 216, respectively. The clerk nodes (e.g., query node 208A and query node 210A) then forward spot reserve message 222 to query nodes 208 and query nodes 210, respectively. Response messages 224 are then sent as a response back to clerk nodes (e.g., query node 208A and query node 210A) upon each node adding a query identifier to its respective queue (not shown, see FIG. 1). Each of the clerk nodes (e.g., query node 208A and query node 210A), upon receiving all response messages 224, sends response 218 and 220, respectively, to initiator node (e.g., query node 210C). Processing then continues as described with respect to FIG. 1 to reserve a non-sharable resource(s) and process the query.

Figure 3:
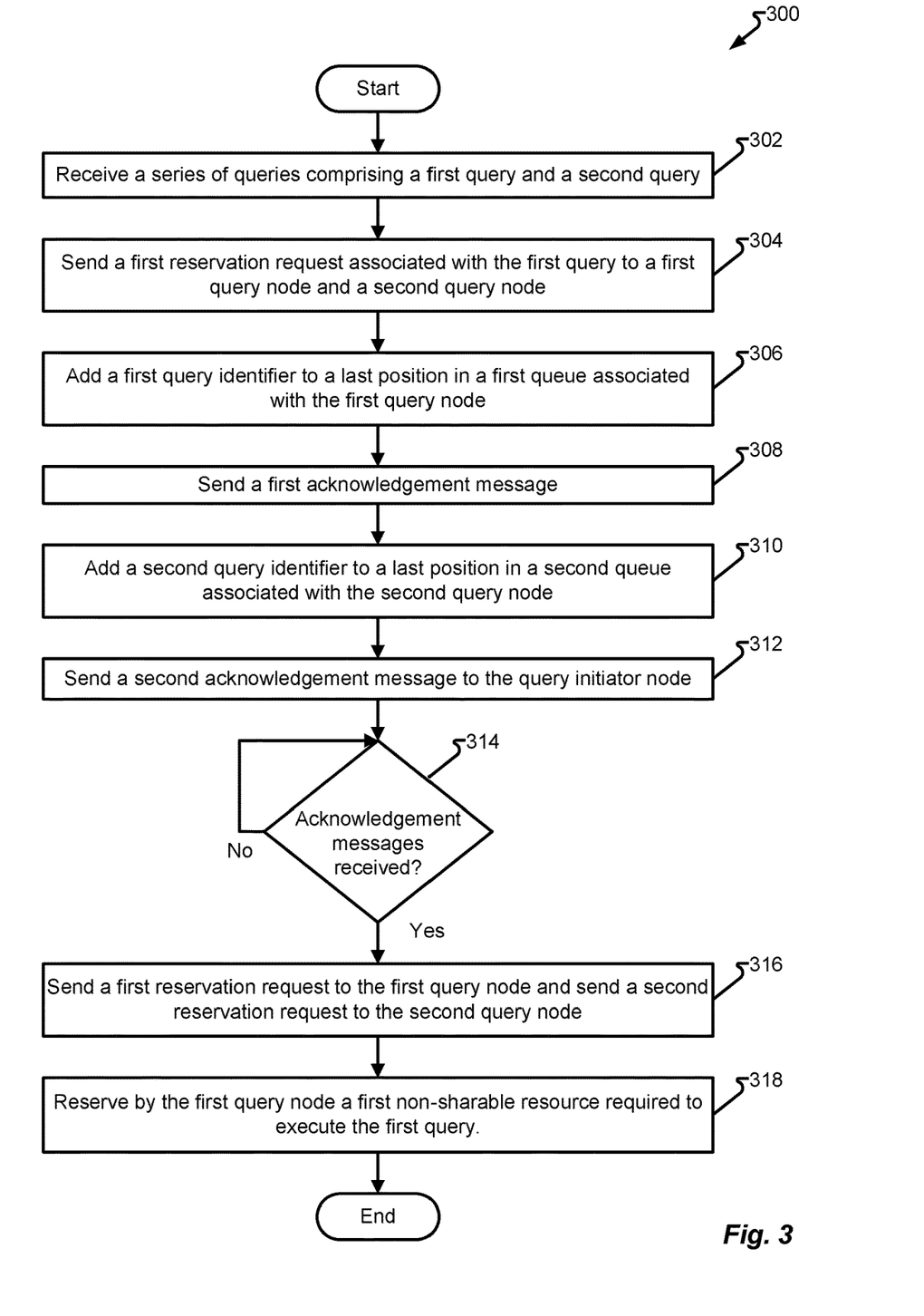
FIG. 3 depicts a process in accordance with embodiments of the present disclosure.

FIG. 3 depicts device process 300 in accordance with embodiments of the present disclosure. In one embodiment, process 300 is embodied as machine-readable instructions maintained in a non-transitory memory that when read by a machine, such as a processor of a server or computer component (e.g., a query node), cause the machine to execute the instructions and thereby execute process 300. In another embodiment, all or portions of process 300 may be executed by two or more machines.

Process 300 begins and, in step 302, a series of queries are received, such as by a query initiator node (see FIG. 1, ref. 102B and FIG. 2, ref. 210C). The series of queries comprise a first and a second query to be performed by query nodes. The first query and/or the second query requires the query nodes to utilize a non-sharable resource. Step 304 sends a first reservation request, such as a request identifying a first query and associated with a non-sharable resource. Step 306 adds the first query identifier to a last position in a first queue associated with the first query node. Next, step 308 sends, from the first query node, an acknowledgement message to the query initiator node.

Step 310 then adds a second query identifier to the last position in a second queue associated with a second query node after which, in step 312, an acknowledgement message is sent from the second query node to the query initiator node. Test 314 determines if both the first and second acknowledgement messages have been received. If test 314 is determined in the negative, testing may loop until such time as test 314 is determined in the affirmative or, as a further embodiment, process 300 may timeout or otherwise terminate due to a failure to receive all acknowledgement messages. Once test 314 is determined in the affirmative, processing continues to step 316, which sends a first reservation request to the first query node and sends a second reservation request to a second query node. Step 318 then causes the first query node to reserve a first non-sharable resource required to execute the first query. As a further option, step 318 further causes the second query node to reserve a second non-sharable resource required for the second query. The first and second non-sharable resources may be discrete or the same non-sharable resource.

Figure 4:
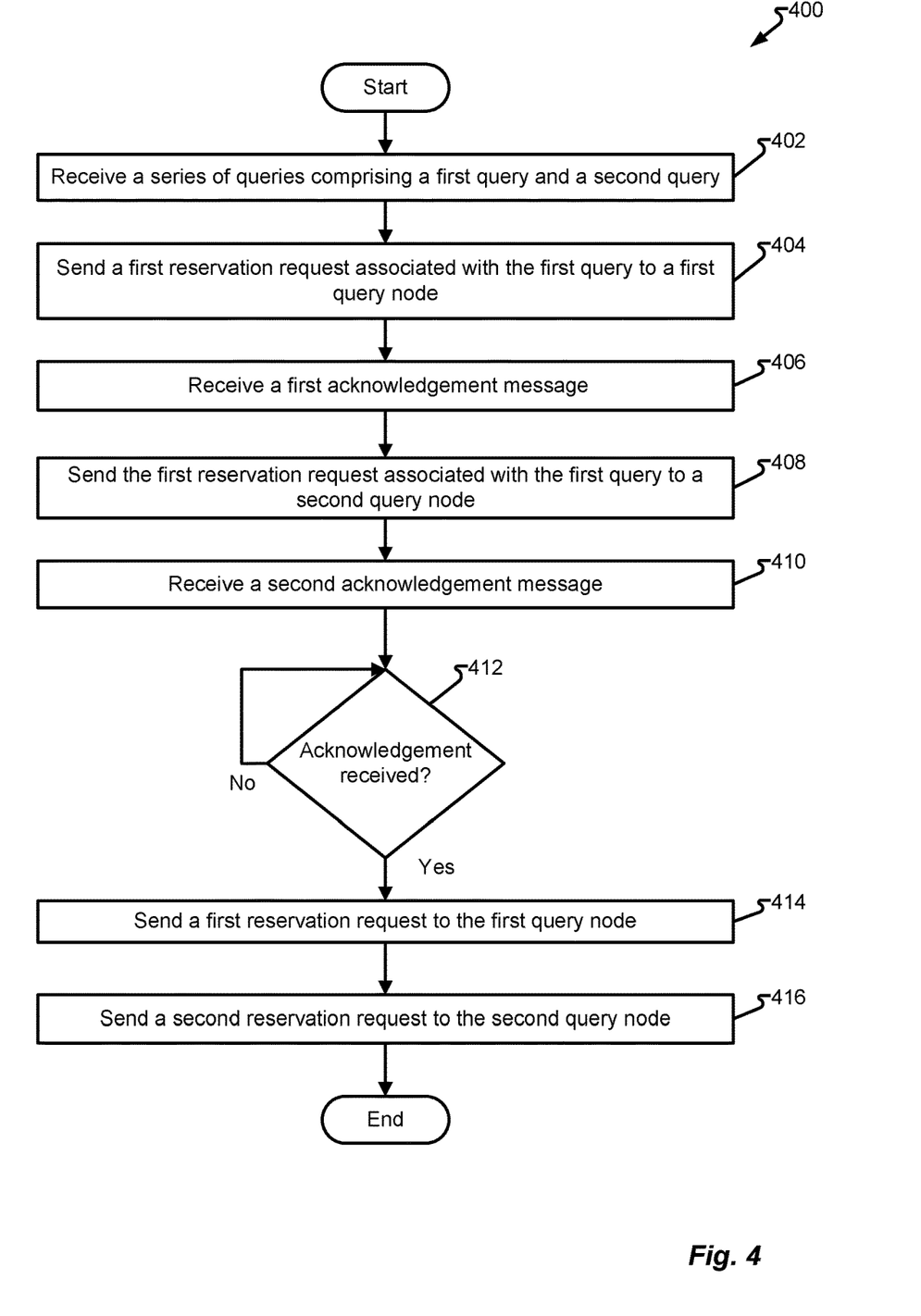
FIG. 4 depicts a process in accordance with embodiments of the present disclosure.

FIG. 4 depicts device process 400 in accordance with embodiments of the present disclosure. In one embodiment, process 400 is embodied as machine-readable instructions maintained in a non-transitory memory that when read by a machine, such as a processor of a server or computer component (e.g., a query node), cause the machine to execute the instructions and thereby execute process 400. In another embodiment, all or portions of process 400 may be executed by two or more machines.

Process 400 begins and, at step 402, a series of queries are received, the series comprising a first query and a second query. Step 404 then sends a first reservation request, by a query initiator node to a first query node, associated with the first query to cause the first query node to add a first query identifier, associated with the first query, to a last position in a first queue associated with the first query node. In response, a first acknowledgement message is received in step 406.

Step 408 then sends the first reservation request associated with the first query to a second query node to cause the second query node to add a second query identifier to a last position in a second queue associated with the second query node and receiving, by the query initiator node. In response, step 410 receives, at the query initiator node, a second acknowledgement message from the second query node.

Test 412 determines if an acknowledgment message has been received by the query initiator node, the acknowledgement message indicating that both the first and second acknowledgment messages have been received, such as by a clerk node. If test 412 is determined in the negative, testing may loop until such time as test 412 is determined in the affirmative or, as a further embodiment, process 400 may timeout or otherwise terminate due to a failure to receive the acknowledgement message. Once test 412 is determined in the affirmative, step 414 sends a first reservation request to the first query node to cause the first query node to reserve a first non-sharable resource. Step 416 sends a second reservation request to the second query node, which causes the first query node to reserve a first non-sharable resource required for the first query. Optionally, step 416 may further send the second reservation request to the second query node to cause the second query node to reserve a second non-sharable resource required to execute the second query. The first and second non-sharable resources may be discrete or the same non-sharable resource.

Figure 5:
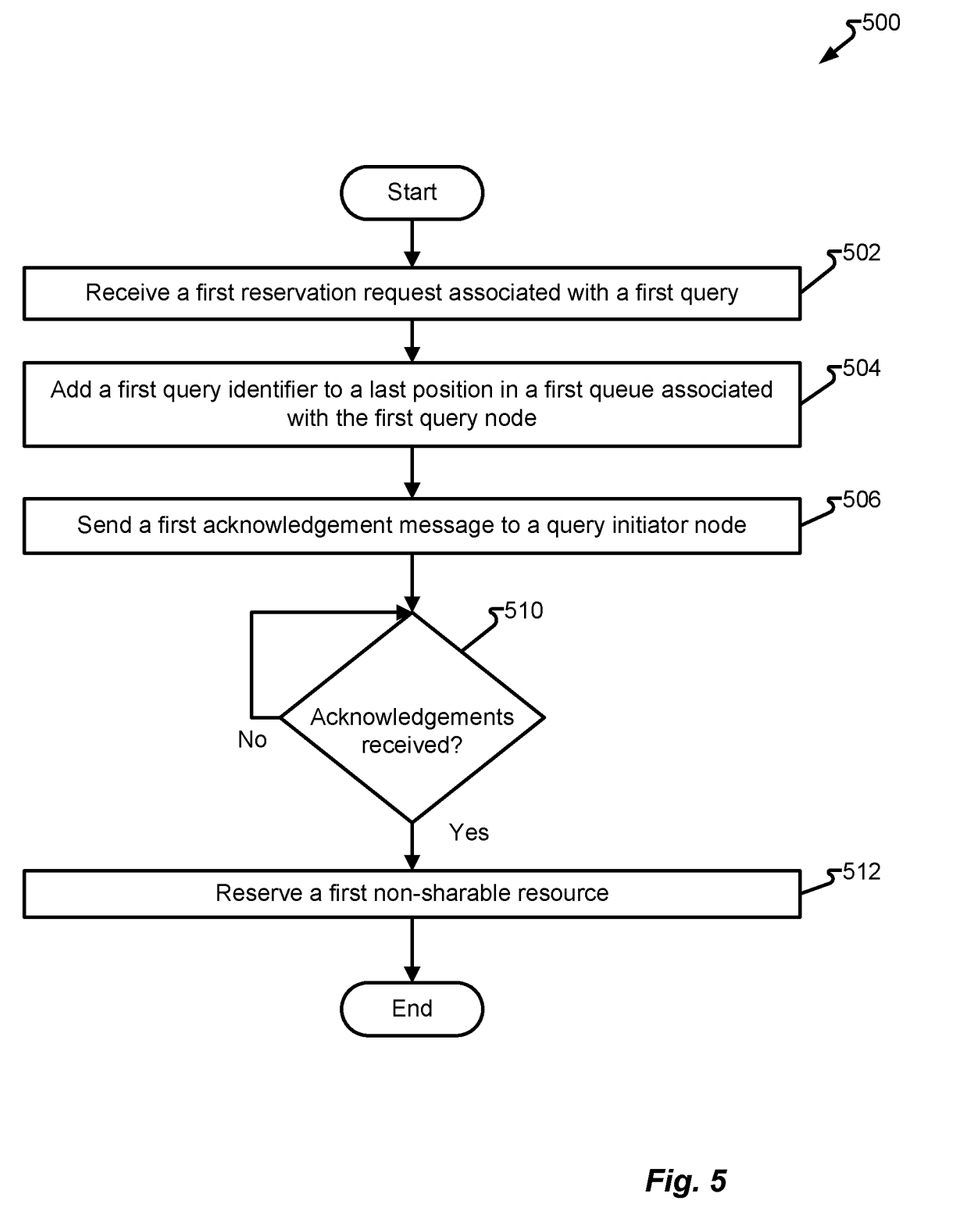
FIG. 5 depicts a process in accordance with embodiments of the present disclosure.

FIG. 5 depicts device process 500 in accordance with embodiments of the present disclosure. In one embodiment, process 500 is embodied as machine-readable instructions maintained in a non-transitory memory that when read by a machine, such as a processor of a server or computer component (e.g., a query node), cause the machine to execute the instructions and thereby execute process 500. In another embodiment, all or portions of process 500 may be executed by two or more machines.

Step 502 receives a first reservation request associated with a first query. The first reservation request may be received by a first query node. Step 504 then adds a first query identifier to the last position of a first queue associated with the first query node and, in step 506, sends a first acknowledgement message to a query initiator node. Test 510 determines if an acknowledgement message has been received by the query initiator node, which also receives a second acknowledgement message from a second query node in response to the second query node adding a second query identifier to a last position in a second queue associated with the second query node. Step 512 then reserves, such as by the first query node, a first non-sharable resource required to execute the first query. The first and second non-sharable resources may be discrete or the same non-sharable resource.

Figure 6:
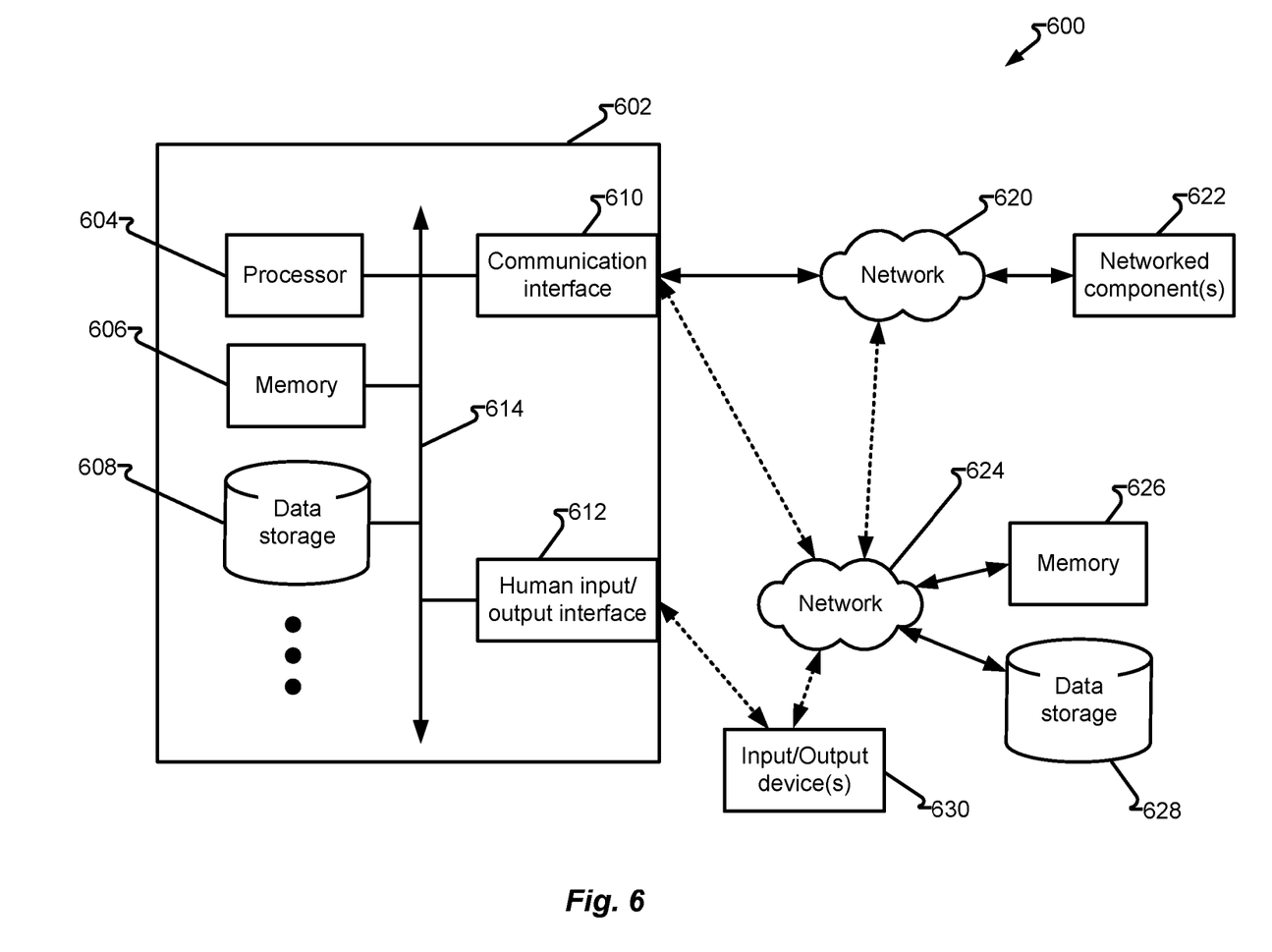
FIG. 6 depicts a system in accordance with embodiments of the present disclosure.

FIG. 6 depicts device 602 in system 600 in accordance with embodiments of the present disclosure. In one embodiment, any one or more of query nodes 102, 208, and/or 210 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may comprise programmable logic functionality, such as determined, at least in part, from accessing machine-readable instructions maintained in a non-transitory data storage, which may be embodied as circuitry, on-chip read-only memory, computer memory 606, data storage 608, etc., that cause the processor 604 to perform the steps of the instructions. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize computer memory 606 and/or data storage 608 for the storage of accessible data, such as instructions, values, etc. Communication interface 610 facilitates communication with components, such as processor 604 via bus 614 with components not accessible via bus 614 and may be embodied as a network interface (e.g., ethernet card, wireless networking components, USB port, etc.). Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or configured to utilize one or more networks, such as network 620 and/or network 624.

Network 620 may be a wired network (e.g., Ethernet), wireless (e.g., WiFi, Bluetooth, cellular, etc.) network, or combination thereof and enable device 602 to communicate with networked component(s) 622. In other embodiments, network 620 may be embodied, in whole or in part, as a telephony network (e.g., public switched telephone network (PSTN), private branch exchange (PBX), cellular telephony network, etc.).

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) than networked components 622, which may be connected to network 620 comprising a public network (e.g., Internet) that may not be as trusted.

Components attached to network 624 may include computer memory 626, data storage 628, input/output device(s) 630, and/or other components that may be accessible to processor 604. For example, computer memory 626 and/or data storage 628 may supplement or supplant computer memory 606 and/or data storage 608 entirely or for a particular task or purpose. As another example, computer memory 626 and/or data storage 628 may be an external data repository (e.g., server farm, array, "cloud," etc.) and enable device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of computer memory 606, data storage 608, computer memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, a switch, a port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system.

Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method of preventing a deadlock in a computing system, comprising:

receiving, by a query initiator node, a series of queries comprising a first query and a second query;

sending, by the query initiator node, a first reservation request associated with the first query to a first query node and a second query node;

adding, in response to receiving the first reservation request, a first query identifier to a last position in a first queue associated with the first query node and, in response, sending a first acknowledgement message to the query initiator node;

adding, in response to receiving the first reservation request, a second query identifier to a last position in a second queue associated with the second query node and, in response, sending a second acknowledgement message to the query initiator node;

upon receiving an acknowledgement message, by the query initiator node, that both the first acknowledgement message and the second acknowledgement message have been received, sending a first reservation request to the first query node and sending a second reservation request to the second query node; and upon receiving the first reservation request and upon further determining that the first query identifier is in a first position of the first queue, reserving by the first query node a first non-sharable resource required to execute the first query.

2. The method of claim 1, wherein sending, by the query initiator node, the first reservation request associated with the first query to the first query node and the second query node, comprises sending, by the query initiator node, the first reservation request associated with the first query to a first clerk node and sending, by the first clerk node, the first reservation request associated with the first query to the first query node and the second query node.

3. The method of claim 2, wherein:
sending the first acknowledgement message to the query initiator node comprises sending the first acknowledgement message to the first clerk node;
sending the second acknowledgement message to the query initiator node comprises sending the second acknowledgement message to the first clerk node; and
upon receiving, by the first clerk node, both the first acknowledgement message and the second acknowledgement message, sending, by the first clerk node, the acknowledgement message to the query initiator node.

4. The method of claim 2, further comprising:
sending, by the query initiator node, the first reservation request associated with the first query to the first clerk node and a second clerk node via an ordered message delivery service;
sending, by the query initiator node via the ordered message delivery service, at least one other message in an order consisting of one of before sending the first reservation request or after sending the first reservation request; and
delivering, by the ordered message delivery service, the first reservation request associated with the first query and the at least one other message to the first query node, the second query node, and a third query node in the order.

5. The method of claim 1, further comprising, upon receiving the second reservation request and upon further determining that the second query identifier is in the first position of the first queue, reserving by the second query node a second non-sharable resource required to execute the first query.

6. The method of claim 5, wherein the first non-sharable resource is the same as the second non-sharable resource.

7. The method of claim 1, wherein the first non-sharable resource is required for execution of both the first query and the second query.

8. The method of claim 1, wherein the first query node, the second query node, and the query initiator node are members of a first sub-cluster of computing nodes in the computing system.

9. A method of preventing a deadlock in a computing system, comprising:
receiving, by a query initiator node, a series of queries comprising a first query and a second query;
sending, by the query initiator node, a first reservation request associated with the first query to a first query node to cause the first query node to add a first query identifier to a last position in a first queue associated with the first query node and receiving, by the query initiator node, a first acknowledgement message;
sending, by the query initiator node, the first reservation request associated with the first query to a second query node to cause the second query node to add a second query identifier to a last position in a second queue associated with the second query node and receiving, by the query initiator node, a second acknowledgement message; and
upon receiving an acknowledgement message, by the query initiator node, that both the first acknowledgement message and the second acknowledgement message have been received, sending the first reservation request to the first query node and sending a second reservation request to the second query node to cause the first query node to reserve a first non-sharable resource required to execute the first query.

10. The method of claim 9, wherein sending, by the query initiator node, the first reservation request associated with the first query to the first query node and the second query node, comprises sending, by the query initiator node, the first reservation request associated with the first query to a first clerk node and sending, by the first clerk node, the first reservation request associated with the first query to the first query node and the second query node.

11. The method of claim 10, wherein:
sending the first acknowledgement message to the query initiator node comprises sending the first acknowledgement message to the first clerk node;
sending the second acknowledgement message to the query initiator node comprises sending the second acknowledgement message to the first clerk node; and
upon receiving, by the first clerk node, both the first acknowledgement message and the second acknowledgement message, sending, by the first clerk node, the acknowledgement message to the query initiator node.

12. The method of claim 10, further comprising:
sending, by the query initiator node, the first reservation request associated with the first query to the first clerk node and a second clerk node via an ordered message delivery service;
sending, by the query initiator node via the ordered message delivery service, at least one other message in an order consisting of one of before sending the first reservation request or after sending the first reservation request; and
delivering, by the ordered message delivery service, the first reservation request associated with the first query and the at least one other message to the first query node, the second query node, and a third query node in the order.

13. The method of claim 9, further comprising, upon receiving the second reservation request and upon further determining that the second query identifier is in a first position of the first queue, reserving by the second query node a second non-sharable resource required to execute the first query.

14. The method of claim 13, wherein the first non-sharable resource is the same as the second non-sharable resource.

15. The method of claim 9, wherein the first non-sharable resource is required for execution of both the first query and the second query.

16. The method of claim 9, wherein the first query node, the second query node, and the query initiator node are members of a first sub-cluster of computing nodes in the computing system.

17. A method of preventing a deadlock in a computing system, comprising:
receiving, by a first query node, a first reservation request associated with a first query;
adding, in response to receiving the first reservation request, a first query identifier to a last position in a first queue associated with the first query node and, in response, sending a first acknowledgement message to a query initiator node;

receiving, by the first query node, confirmation that the first acknowledgement message has been received by the query initiator node and further confirming a second acknowledgement message has been received by the query initiator node from a second query node upon the second query node adding a second query identifier to a last position in a second queue associated with the second query node; and in response to the confirmation, reserving, by the first query node, a first non-sharable resource required to execute the first query.

18. The method of claim 17, wherein the first query node and the second query node are members of a first sub-cluster of computing nodes in the computing system.

19. The method of claim 18, wherein receiving, by the first query node, the first reservation request associated with the first query comprises receiving the first reservation request associated with the first query from a first clerk node, wherein the first clerk node further sends the first reservation request to the second query node.

20. The method of claim 19, wherein the first non-sharable resource is required for execution of both the first query and a second query for execution by the second query node.

\* \* \* \* \*